United States Patent Office 3,819,601
Patented June 25, 1974

3,819,601
α-CARBOXY - 2 - THIENYLMETHYLPENICILLIN AND CEPHALOSPORIN AND ESTERS AND SALTS THEREOF
Robert L. Rosati, New London, Conn., assignor to Pfizer Inc., New York, N.Y.
No Drawing. Filed Feb. 24, 1972, Ser. No. 229,175
Int. Cl. C07d 99/16, 99/24
U.S. Cl. 260—239.1          2 Claims

ABSTRACT OF THE DISCLOSURE

Compounds of the formulae

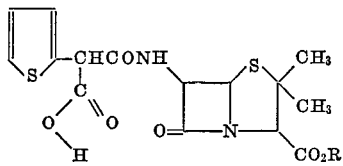

and

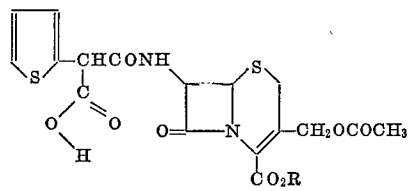

wherein R is hydrogen or 1-alkanoyloxyalkyl wherein said alaknoyl contains from 2 to 5 carbon atoms and said alkyl contains from 1 to 4 carbon atoms and the pharmaceutically acceptable base salts thereof as broad spectrum antibiotics.

BACKGROUND OF THE INVENTION

This invention relates to a series of penicillins and cephalosporins, and in particular to α-carboxy-2-thienylmethylpenicillins and α-carboxy-2-thienylmethylcephalosporins and to esters and base salts thereof, possessing high antibacterial activity.

The compounds in these groups belonging to the families of penicillins and cephalosporins differ from one another, within each class, in the nature of the R variable and possess the general formulae indicated below wherein the acyl moiety on the 6-aminopenicillanic acid or the 7-aminocephalosporanic acid is derived from a carboxylic acid or functional derivative thereof, such as an acyl halide or anhydride.

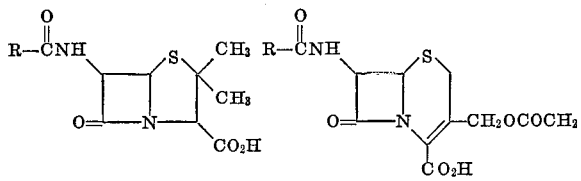

The pharmacodynamic and antibacterial characteristics of a given penicillin or cephalosporin are dictated to a great extent by the nature of the R group. The most widely used pencillins are those wherein the R moiety is represented by benzyl-, phenoxymethyl- and α-phenoxyethyl-. While these well-known congeners are highly effective against gram-positive microorganisms they have little gram-negative activity. Consequently, drugs which will combat gram-negative infections, e.g., E. coli, in addition to having gram-positive activity, are of value to the medical profession.

Recent attempts to improve the profile of activity within the family of penicillins has resulted in the preparation of α-carboxybenzylpenicillin (U.S. Pat. 3,142,673), a broad spectrum antibiotic with greater efficacy against gram-negative infections via the parenteral route of administration.

While U.S. Pat. 3,282,926 discloses both α-carboxy-2-thienylmethylpenicillin and α-carboxy-3-thienylmethylpenicillin, the latter 3-isomeric congener being claimed, the synthetic route presented does not represent an enabling procedure for the preparation of detectable amounts of α-carboxy-2-thienylmethylpenicillin.

Alkyl, benzyl and nitrobenzyl esters of α-carboxy-2- and 3-thienylmethylpenicillin are claimed in U.S. Pat. 3,502,656. Hydrolysis of the benzyl ester of α-carboxy-2-thienylmethylpenicillin during paper chromatography is described, and reputed to give rise to a spot ($R_f$ 0.03) attributed to the free acid, α-carboxy-2-thienylmethylpenicillin. Replication of this hydrolysis procedure failed to provide any spot which aligned itself with authentic, well characterized α-carboxy-2-theinylmethylpenicillin.

α-Carboxy-3-thienylmethylcephalosporin is disclosed as an antimicrobial agent in South African Pat. 68/1,208.

SUMMARY OF THE INVENTION

It has now been found that penicillins and cephalosporins of the formulae

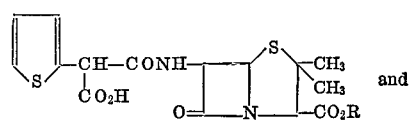

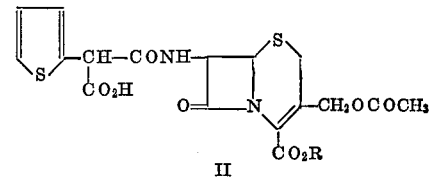

and the pharmaceutical acceptable base salts thereof, wherein

R is selected from the group consisting of hydrogen and 1-alkanoyloxyalkyl wherein said alkanoyl contains from 2 to 5 carbon atoms and said alkyl contains from 1 to 4 carbon atoms, are characterizable compounds, preferable in good yields and highly active against both gram-positive and gram-negative microorganisms.

The preferred antibacterials of the instant invention are those congeners of formula I wherein R is hydrogen or 1-alkanoyloxymethyl.

A second preferred class of compounds are those of formula II wherein R is hydrogen or 1-alkanoyloxymethyl.

DETAILED DESCRIPTION OF THE INVENTION

In accordance with the process employed for synthesizing the penicillins and cephalosporins of the present invention, wherein R is as previously indicated, the following scheme is illustrative:

cedure of Binder et al., J. Antibiot. (Tokyo), Series B, 24, 767 (1971).

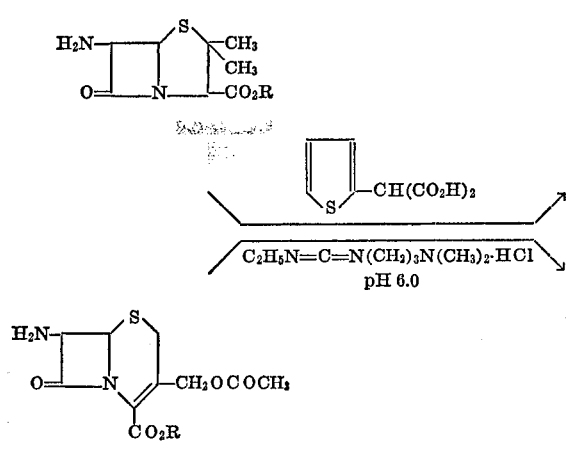

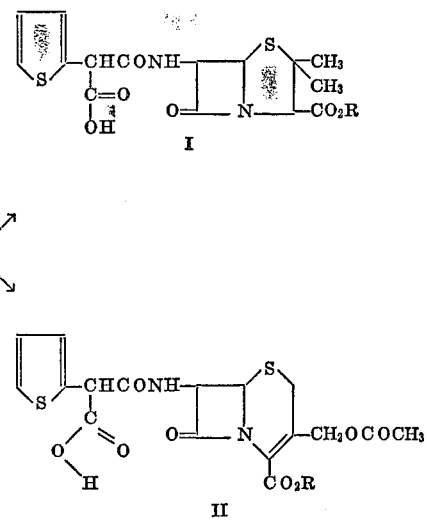

In practice, 6 - aminopenicillanic, 7 - aminocephalosporanic acid or their previously indicated esters, wherein R is 1-alkanoyloxyalkyl, are coupled with 2-thienylmalonic acid and a water soluble carbodiimide in a reaction-inert solvent at ambient temperatures. Equimolar amounts of the reagents are generally employed, with as much as a ten percent excess of the amino compound and carbodiimide providing excellent yields of the desired products. To obtain optimum results it is preferred that the pH of the reaction mixture be maintained at approximately 6.0 by the addition of either 6 N hydrochloric acid or a saturated solution of sodium bicarbonate.

The reaction-inert solvent comprising the liquid phase of said reaction mixture can be aqueous or water plus a water miscible reaction-inert solvent such as acetone, tetrahydrofuran, dioxane or dimethylformamide.

As previously mentioned, the carbodiimide coupling reagents most suitable for the preparation of the compounds of the present invention are those belonging to the class of water soluble carbodiimides which contain within their chemical structure a basic amino group capable of forming an acid addition salt and thus conferring water solubility. The preferred carbodiimide for the synthesis of the herein described compounds is N-ethyl-N-3-(dimethylamino)propylcarbodiimide.

On completion of the above-mentioned reaction, wherein 6-aminopenicillanic or 7-aminocephalosporanic acids are the starting reagents, the pH is raised to approximately 8, and any non-acidic by-products are extracted with a water-immiscible solvent. Subsequently the aqueous phase is made acid and the product extracted and converted to a more readily handleable form such as salt.

Reactions wherein the corresponding esters are employed as the starting reagents are adjusted, on completion, to approximately pH 7, saturated with sodium chloride and the sodium salt of the product extracted into a water-immiscible solvent such as ethyl acetate. The isolated sodium salt can be further purified or converted to a different salt or free acid.

The 6-aminopenicillanic acid esters utilized in the preparation of compounds related to I wherein R is 1-alkanoyloxyalkyl are synthesized by the method as taught by V. Daehne et al., J. Med. Chem., 13, 607 (1970), which comprises alkylation of a 6-aminopenicillanic acid salt with a suitable 1-alkanoyloxyalkyl halide, the preparation of which are taught by Ulich et al., J. Am. Chem. Soc., 43, 660 (1921), Euranto et al., Acta. Chem. Scand., 20, 1273 (1966) and Rasmussen et al., J. Am. Chem. Soc., 89, 5442, (1967).

7-Aminocephalosporanic acid esters leading to the compounds related to II are prepared according to the procedure of Binder et al., J. Antibiot. (Tokyo), Series B, 24, 767 (1971).

2-Thienylmalonic acid is synthesized by the method of Ivanov et al., Compt. rend. Acad. bulgare sci., 8, (1), 29 (1955); C.A. 50, 12016c (1956).

As has been previously noted, a characteristic feature of the acidic penicillins and cephalosporins of the present invention is their ability to form basic salts. Said salts are formed at the α-carboxy group as well as at the 3-carboxy, i.e., when R is hydrogen, allowing for the preparation of either a mono- or dibasic salt. When R is hydrogen the nature of the salt, i.e., mono- or di- will be determined to a great extent by the amount of basic reagent employed relative to the amount of starting acid. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as triethylamine, N-methylpyrrolidine, N-methylmorpholine and 1,5-diazabicyclo[4,3,0]-5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention, which form basic salts, it is preferred, of course, to use pharmaceutically acceptable salts. Although water insolubility, high toxicity, or lack of crystalline nature may make some particular salt species unsuitable or less desirable for use as such in a given pharmaceutical application, the water insoluble or toxic salts can be converted to the corresponding pharmaceutically acceptable bases by decomposition of the salt as described above, or alternately they can be converted to any desired pharmaceutically acceptable basic salt. The said pharmaceutically acceptable salts preferred include the sodium, aluminum, potassium, calcium, magnesium, ammonium and substituted ammonium, e.g., procaine, dibenzylamine, N,N'-dibenzylethylenediamine, N,N-bis(dihydroabietyl)ethylenediamine, 1 - ephenamine, N-ethylpiperidine, N-benzyl-β-phenethylamine, triethylamine, as well as salts with other amines which have been used to form salts with penicillins and cephalosporins.

The penicillins and cephalosporins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These penicillins and cephalosporins are also effective antibacterial agents *in vivo* in animals, including man, especially *via* the parenteral route of administration.

Obviously, the physician will ultimately determine the dosage which will be most suitable for a particular individual person, and it will vary with the age, weight and response of the particular patient as well as with the nature and extent of the symptoms and the pharmacodynamic characteristics of the particular agent to be administered. It will often be found that when the composition is administered orally, larger quantities of the active ingredient will be required to produce the same level as produced by a small quantity administered parenterally.

Having full regard for the foregoing factors it is considered that an effective daily oral dose of the compounds of the present invention in humans of approximately 500–2000 mg./kg. per day, with a preferred range of about 750–1500 mg./kg. per day in single or divided doses, and a parenteral dose of 20–400 mg./kg. per day, with a preferred range of about 30–300 mg./kg. will effectively alleviate the symptoms of the infection. These values are illustrative, and there may, of course, be individual cases where higher or lower dose ranges are merited.

Many of the penicillin and cephalosporin ester compounds of this invention exhibit improved absorption on oral administration over that produced by the corresponding free acid or alkali metal salt forms. They, therefore, represent convenient and effective dosage forms of α-carboxy derivatives of 2-thienylmethyl- penicillin and cephalosporin.

Further, many of the esters described herein, although inactive or of relatively low activity against gram-negative organisms *per se* are, when administered orally to animals, including man, metabolized to the parent acid, which has a wide spectrum of activity against gram-positive and gram-negative bacteria. They thus serve as pro-drug forms of the parent compounds since they are biologically converted *in vivo* to said compounds. The rate of metabolic conversion of such esters to the parent acid occurs at such a rate as to provide an effective and prolonged concentration of the parent acid in the animal body. In effect, such esters act as depot sources for the parent acid.

The preferred penicillins of the instant invention are 6-[2-carboxy-2-(2-thienyl)acetamido]penicillanic acid and 6-[2-carboxy-2-(2-thienyl)acetamido]penicillanic acid, 3-pivaloyloxymethyl ester, while the preferred cephalosporins are 7-[2-carboxy-2-(2-thienyl)acetamido]cephalosporanic acid and 7-[2-carboxy-2-(2-thienyl)acetamido]caphalosporanic acid, 4-pivaloyloxymethyl ester.

The antimicrobial spectra of 6-[2-carboxy-2(2-thienyl)acetamido]penicillanic acid against several bacteria is presented below in Table I wherein a comparison is made with the corresponding 6-[2-carboxy-2-(3-thienyl)-acetamido]penicillanic acid. The tests were run under standardized conditions in which nutrient broth containing various concentrations of the test material was seeded with the particular organism specified, and the minimum concentration (MIC) at which growth of each organism failed to occur was observed and recorded.

TABLE I

*In vitro* data for 6-[2-carboxy-2-(2-thienyl)acetamido]penicillanic acid and 6[2-carboxy-2-(3-thienyl)acetamido]penicillanic acid (MIC; mcg./ml.)

| Organism | 6-[2-carboxy-2-(2-thienyl) acetamido] penicillanic acid | 6-[2-carboxy-2-(3-thienyl) acetamido] penicillanic acid |
|---|---|---|
| S. aureus 01A005 | 0.22 | 1.04 |
| S. aureus 01A006 | 0.78 | 12.5 |
| S. aureus 01A400 | 41.7 | 50 |
| Strep. pyogenes 02C668 | 0.045 | 0.28 |
| Strep. faecalis 02A001 | 20.8 | 1.33 |
| Dip. pneumoniae 03A001 | 0.045 | 0.65 |
| E. coli 51A266 | 3.64 | 2.08 |
| E. coli 51A002 | >200 | >200 |
| Ps. aeruginosa | 25 | 20.8 |
| K. pneumoniae 53A015 | >200 | >200 |
| H. influenzae | 0.16 | 0.04 |
| A. aerogenes | 25 | 16.7 |
| P. mirabilis 57C020 | 12.5 | 8.3 |
| P. vulgaris 57A059 | 5.2 | 6.25 |
| P. rettgeri 57B006 | 2.60 | 2.60 |
| P. morgani 57G006 | 25 | 25 |
| Ser. marcescens 63A001 | 58.3 | 58.3 |
| M. polymorpha 65A001 | 8.3 | 66.7 |
| M. mallei 62A001 | 12.5 | 100 |
| Sal. typhosa 58B344 | 10.4 | 83.3 |

In general, the data of Table I indicates that 6-[2-carboxy-2-(2-thienyl)acetamido]penicillanic acid has considerable activity against gram-positive organisms and is more active against these bacteria than the corresponding 3-thienyl congener. While the 3-thienyl analog is approximately 4 times as active against the gram-positive *H. influenzae* as the 2-thienyl compound, 6-[2-carboxy-2-(2-thienyl)acetamido]penicillanic acid is approximately 8 times more active than the 3-isomeric congener against the gram-negative bacteria *M. polymorpha*, *M. mallei* and *S. typhosa*.

Tables II and IIA represent *in vivo* data for the 2- and 3-thienyl isomers, i.e., 6-[2-carboxy-2-(2-thienyl)acetamido]penicillanic acid and 6-[2-carboxy-2-(3-thienyl)acetamido]penicillanic acid, respectively, against several experimental infections in mice. The values (survivors/total number of infected mice) are obtained under standard conditions known to those skilled in the art. The test compound is administered to the infected mice by a multiple dosing regimen in which the first dose is given 0.5 hour atfer inoculation and is repeated four and twenty-four hours later.

TABLE II

*In vivo* data for 6-[2-carboxy-2-(2-thienyl)acetamido]penicillanic acid vs. several bacterial infections in mice*

| | E. coli 266 | | Staph. aureus 005 | |
|---|---|---|---|---|
| | PO | SQ | PO | SQ |
| Dose (mg./kg.): | | | | |
| 200 | 10/10 | 10/10 | 10/10 | 10/10 |
| 50 | 7/10 | 8/10 | 10/10 | 10/10 |

*PO=oral; SQ=subcutaneous route of administration. Ratio of suvivors/total mice.

TABLE IIA

*In vivo* data for 6-[2-carboxy-2-(3-thienyl)acetamido]penicillanic acid vs. several bacterial infections in mice*

| | E. coli 266 | | Staph. aureus 005 | |
|---|---|---|---|---|
| | PO | SQ | PO | SQ |
| Dose (mg./kg.): | | | | |
| 200 | 9/10 | 10/10 | 8/10 | 10/10 |
| 50 | 6/10 | 9/10 | 1/10 | 10/10 |

*See footnote at end of Table II.

Comparison of the data in Tables II and IIA suggests that although both compounds have approximately the same *in vivo* activity against *E. coli* by both the oral and subcutaneous routes of administration, the 2-isomeric congener of the present invention demonstrates considerably better *in vivo* activity against *Staph. aureus* than the 3-isomer, especially by the oral route of administration.

The antimicrobial spectra of 7-[2-carboxy-2-(2-thienyl)acetamido]cephalosporanic acid and the 3-thienyl isomer in the cephalosporin series, 7-[2-carboxy-2-(3-thienyl)

acetamido]cephalosporanic acid, is presented in Table III. Again, the tests are run under standardized conditions in which nutrient broth containing various concentrations of the test material is seeded with the particular organism specified, and the minimum concentration (MIC) at which growth of each organism failed to occur is observed and recorded.

TABLE III

*In vitro* data for 7-[2-carboxy-2-(2-thienyl)acetamido]cephalosporanic acid and 7-[2-carboxy-2-(3-thienyl)acetamido]cephalosporanic acid (MIC; mcg./kg.)

| Organism | 7-[2-carboxy-2-(2-thienyl)-acetamido]-cephalosporanic acid | 7-[2-carboxy-2-(3-thienyl)-acetamido]-cephalosporanic acid |
|---|---|---|
| *S. aureus* 01A005 | 0.52 | 6.25 |
| *S. aureus* 01A006 | 0.65 | 25 |
| *S. aureus* 01A400 | 1.30 | 25 |
| *Strep. pyogenes* 02C668 | 0.19 | 1.56 |
| *Dip. pneumoniae* 03A001 | 0.12 | 1.56 |
| *E. coli* 51A266 | 8.3 | 6.25 |
| *Ps. aeruginosa* 52A490 | 6.25 | 0.781 |
| *K. pneumoniae* 53044 | 12.5 | 50 |
| *H. influenzae* 54A001 | 1.56 | 1.56 |
| *A. aerogenes* 55A002 | 25 | 12.5 |
| *P. mirabilis* 57C015 | 12.5 | 1.56 |
| *P. vulgaris* | 20.8 | 12.5 |
| *P. rettgeri* | 33.3 | |

The data of Table III suggests that against gram-positive microorganisms the 2-thienyl congener of the present invention is markedly superior to the 3-isomer, while against gram-negative organisms the 3-isomer is somewhat superior.

Tables IV and IVA present *in vivo* data for the 2- and the 3-thienyl isomers in the cephalosporin series, 7-[2-carboxy-2-(2-thienyl)acetamido]cephalosporanic acid and 7-[2-carboxy-2-(3-thienyl)acetamido]cephalosporanic acid, respectively, against several experimental infections in mice.

The values (survivors/total number of infected mice) are obtained under standard conditions known to those skilled in the art. The test compound is administered to the infected mice by a multiple dosing regimen in which the first dose is given 0.5 hour after inoculation and is repeated four and twenty-four hours later.

The data present suggest a marked advantage in the utility of the 2-thienyl isomer compared to the 3-isomer as an antibacterial agent, especially against *Staph. aureus*.

TABLE IV

*In vivo* Data for 7-[2-carboxy-2-(2-thienyl)acetamido]cephalosporanic acid vs. several bacterial infections in mice*

| | *E. coli* 266 | | *Staph. aureus* 005 | |
|---|---|---|---|---|
| | PO | SQ | PO | SQ |
| Dose (mg./kg.): | | | | |
| 200 | 6/10 | 10/10 | 7/10 | 10/10 |
| 50 | 2/10 | 10/10 | 3/10 | 9/10 |

*PO=oral; SQ=subcutaneous route of administration. Ratio of survivors/total mice.

TABLE IVA

*In vivo* data for 7-[2-carboxy-2-(3-thienyl)acetamido]cephalosporanic acid vs. several bacterial infections in mice*

| | *E. coli* 266 | | *Staph. aureus* 005 | |
|---|---|---|---|---|
| | PO | SQ | PO | SQ |
| Dose (mg./kg.): | | | | |
| 200 | 2/10 | 8/10 | 0/10 | 3/10 |
| 50 | 2/10 | 5/10 | 2/10 | 2/10 |

*See footnote at end of Table IV.

The penicillins and cephalosporins of this invention are of value as antibacterial agents and are remarkably effective in treating a number of infections caused by susceptible gram-negative and gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or nonaqueous such as fatty oils of vegetable origin (cottonseed, peanut oil, corn, sesame) and other nonaqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE 1

6-[2-carboxy-2-(2-thienyl)acetamido]penicillanic acid, monosodium salt

The pH of a suspension of 372 mg. (2 mmoles) of 2-thienylmalonic acid in 10 ml. of water is adjusted to 6.0 by the careful addition of a saturated sodium bicarbonate solution. To the resulting solution is added 454 mg. (2.1 mmoles) of 6-aminopenicillanic acid, the pH again adjusted to 6.0 and the reaction mixture cooled in an ice-bath to 0° C.

N - ethyl-N'-(3-dimethylamino)propylcarbodiimide hydrochloride (402 mg., 2.1 mmoles) is added, and the resulting reaction mixture alowed to stir for 5 minutes at ice-bath temperatures and for 2 hours at room temperature, the pH continuingly being maintained between 5.8 and 6.0 by the careful addition of 6 N hydrochloric acid. The pH is raised to 7.7 by the addition of a saturated sodium bicarbonate solution and the resulting mixture extracted with ethyl acetate. The organic layer is discarded, and the aqueous layer is treated with sufficient 6 N hydrochloric acid to bring the pH to 2.6. The product is extracted into ethyl acetate, and the extracts subsequently back-washed with water and a saturated brine solution and dried over sodium sulfate. Ethyl acetate containing 2.0 mmoles of sodium hexanoate is added to the dried extracts, and the gummy precipitated monosodium salt of the product stored in the cold for 30 minutes. The ethyl acetate supernatant is decanted, and the product triturated with acetone and filtered under nitrogen, 490 mg. (66%).

Nuclear-Magnetic Resonance Peak ($D_2O$): $\delta$=1.5 s. (6H), 4.32 s. (1H), 5.6 s. (2H), 7.12 m. (2H) and 7.42 g. (1H).

Infrared Peaks (KBr): $\mu$=2.87, 5.67, C=O, 5.88, 6.06 and 6.24

EXAMPLE 2

7-[2-carboxy-2-(2-thienyl)acetamido]cephalosoporanic acid monosodium salt

Following a procedure similar to that employed for Example 1, a solution of 372 mg. (2 mmoles) of 2-thienylmalonic acid in 10 ml. of water at a pH of 6.0 and cooled in an ice-bath, is treated with 571 mg. (2.1 mmoles) of 7-aminocephalosporanic acid, the pH being adjusted back to 6.0 subsequent to the addition. N-ethyl-N'-3-(dimethylamino)propylcarbodiimide is added, and the reaction mixture allowed to stir 5 minutes at ice-bath temperatures and 75 minutes at room temperature. Hydrochloric acid (6 N) is added periodically to adjust the pH between 5.8 and 6.1 during the reaction period at room temperature. The pH is finally raised to 7.7, and the reaction mixture extracted with ethyl acetate. Hydrochloric acid is added to the separated aqueous phase until a pH of 2.6 is reached, and the resulting acidified phase extracted several times with ethyl acetate. The combined organic extracts are back-washed with water and a saturated brine solution and subsequently dried over sodium sulfate. The filtered ethyl acetate is treated with 2 mmoles of sodium hexanoate dissolved in the same solvent, and the mixture allowed to stand at room temperature while the monosodium salt precipitates. The supernatant ethyl acetate is decanted, and the residual solid triturated with acetone and filtered, 384 mg. (41.6%).

Nuclear Magnetic Resonance Peaks ($D_2O$): $\delta$=2.08 s. (3H), 3.4 m. (2H), 4.80 s. (2H), 5.05 m. (1H), 5.62 m. (1H), 7.10 m. (2H) and 735 m. (1H).

Infrared Peaks (KBr): $\mu$=2.87, 5.65, C=O, 6.01 and 6.24.

EXAMPLE 3

6-[2-carboxy-2-(2-thienyl)acetamido]penicillanic acid, 3-pivaloyloxymethyl ester sodium salt In a manner similar to that employed in Example 1 and 2, 372 mg. (2 mmoles) of 2-thienylmalonic acid in 10 ml. of water at ice-bath temperatures and at a pH of 6.0 is treated with 769 mg. (2.1 mmoles) of 6-aminopenicillanic acid, pivaloyloxymethyl ester hydrochloride. The pH is raised to 8.0 using a saturated sodium bicarbonate solution before a complete solution is effected. The pH is lowered to 6.0 by the addition of 6 N hydrochloric acid and 402 mg. (2.1 mmoles) of N-ethyl-N'-3-(dimethylamino)propylcarbodiimide hydrochloride is added. The reaction is allowed to stir at ice-bath temperatures with periodic readjustments of pH to 5.8–6.0 until there is no longer a change in the pH of the reaction mixture. Sufficient saturated sodium bicarbonate solution is added to bring the pH to 7.2, and the reaction mixture is saturated with sodium chloride and extracted several times with ethyl acetate. The combined ethyl acetate layers are washed with a saturated brine solution, dried over sodium sulfate and concentrated to dryness. The desired product is washed several times with ether and filtered.

EXAMPLE 4

Starting with the appropriate 6-aminopenicillanic acid ester and following the procedure of Example 3, the following congeners are isolated as their sodium salts:

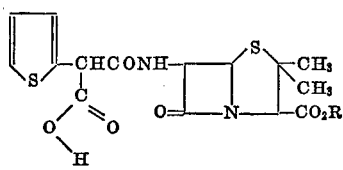

| R | R |
|---|---|
| $CH_3CO_2CH_2$— | $CH_3(CH_2)_2CO_2CH(C_2H_5)$— |
| $CH_3CO_2CH(CH_3)$— | $CH_3(CH_2)_3CO_2CH_2$— |
| $CH_3CO_2CH(C_2H_5)$— | $CH_3(CH_2)_3CO_2CH(C_3H_7)$— |
| $C_2H_5CO_2CH_2$— | $(CH_3)_3CCO_2CH(CH_3)$— |
| $C_2H_5CO_2CH(CH_3)$— | $(CH_3)_3CCO_2CH(C_2H_5)$— |
| $C_2H_5CO_2CH(C_3H_7)$— | $CH_3CO_2CH(C_3H_7)$— |
| $(CH_3)_2CHCO_2CH_2$— | $CH_3CH(CH_3)CO_2CH_2$— |
| $(CH_3)_2CHCO_2CH(CH_3)$— | $CH_2CH(CH_3CO_2$ |
| $CH_3(CH_2)_2CO_2CH_2$— | $CH(CH_2)$— |
|  | $(CH_3)_2CHCH_2CO_2CH_2$— |

EXAMPLE 5

7-[2-carboxy-2-(2-thienyl)acetamido]cephalosporanic acid, 4-acetoxymethyl ester sodium salt By a procedure analogous to Example 3, 744 mg. (4 mmoles) or 2-thienylmalonic acid in 20 ml. of water at pH 6, and cooled in an ice bath is contacted with 1.4 g. (4.2 mmoles) of 7-aminocephalosporanic acid, 4-acetoxymethyl ester and stirring continued until almost all the reagent is dissolved. N-ethyl-N'-3-(dimethylamino)propylcarbodiimide hydrochloride (805 mg., 4.2 mmoles) is added and the reaction mixture allowed to stir at room temperature, the pH being periodically adjusted to 5.8–6.1 by the careful addition of 6 N hydrochloric acid. Cessation in further changes in the pH is generally indicative of the completion of the reaction. A saturated solution of sodium bicarbonate is added until the pH reaches 7.2. The reaction mixture is saturated with sodium chloride and the sodium salt of the final product extracted with ethyl acetate. The combined ethyl acetate extracts are dried over sodium sulfate and concentrated in vacuo to near dryness. Diethyl ether is added, and the precipitated product is filtered and dried under reduced pressure.

EXAMPLE 6

Employing the procedures of Example 5, and starting with the requisite cephalosporanic acid ester, the following compounds are synthesized as their sodium salts:

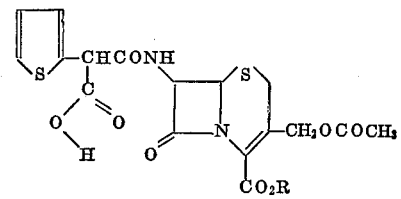

| R | R |
|---|---|
| $CH_3CO_2CH(CH_3)$— | $CH_3(CH_2)_2CO_2CH(C_2H_5)$— |
| $CH_3CO_2CH(C_2H_5)$— | $CH_3(CH_2)_3CO_2CH(C_3H_7)$— |
| $C_2H_5CO_2CH_2$— | $(CH_3)_3CCO_2CH_2$— |
| $C_2H_5CO_2CH(CH_3)$— | $(CH_3)_2CHCH_2CO_2CH_2$— |
| $(CH_3)_2CHCO_2CH_2$— | $(CH_3)_2CHCO_2CH(CH_3)$— |
| $CH_3(CH_2)_2CO_2CH_2$— | |

EXAMPLE 7

6-[2-carboxy-2-(2-thienyl)acetamido]penicillanic acid monopotassium salt

One gram of 6-[2-carboxy-2-(2-thienyl)acetamido]penicillanic acid sodium salt is dissolved in 10 ml. of water, layered over ethyl acetate and sufficient 6 N hydrochloric acid added to give a pH of 2.6. The organic phase is separated, dried over sodium sulfate and concentrated at 0° C. in vacuo to dryness. The residual acid is treated with 5 ml. of water containing 138 mg. of potassium hydroxide, and the resulting solution freeze dried. The potassium salt is triturated with acetone, filtered and dried in vacuo.

In a similar manner, the mono- ammonium, sodium, calcium and magnesium salts of 6-[2-carboxy-2-(2-thienyl)acetamido]penicillanic acid and the penicillins of Example 4 are prepared.

EXAMPLE 8

6-[2-carboxy-2-(2-thienyl)acetamido]penicillanic acid diammonium salt

To 6-[2-carboxy-2-(2 - thienyl)acetamido]penicillanic acid, generated from 2 g. of the monosodium salt according to the procedure of Example 7, is added 15 ml. of a 1 N ammonium hydroxide solution. The resulting solution is freeze dried and the residual product triturated with acetone, filtered and dried in vacuo.

11

In like manner, the corresponding di- sodium, potassium, calcium and magnesium salts of the congeners of Examples 1 and 4 are similarly prepared.

EXAMPLE 9

6-[2-carboxy-2-(2-thienyl)acetamido]penicillanic acid 3-pivaloyloxymethyl ester potassium salt

Five and two-tenths grams of 6-[2 - carboxy - 2 - (2-thienyl)acetamido penicillanic acid, 3-pivaloyloxymethyl ester sodium salt, prepared in Example 3, is added to 35 ml. of water, and the pH adjusted to 2.6 using 6 $N$ hydrochloric acid. The acidified mixture is extracted several times with ethyl acetate, and the combined organic layers are dried over sodium sulfate and concentrated to dryness *in vacuo*. The residual acid is treated with 45 ml. of water containing 600 mg. of potassium hydroxide, and the resulting solution freeze dried. The residual product is subsequently washed with acetone and dried *in vacuo*.

EXAMPLE 10

Employing the procedure of Example 9, the penicillin and cephalosporin esters of Examples 4 and 6, respectively, are converted to their sodium, potassium, ammonium, calcium and magnesium salts.

EXAMPLE 11

By substitution of 7-[2-carboxy - 2 - (2 - thienyl)acetamido]cephalosporanic acid for 6-[2 - carboxy - 2 - (2-thienyl)acetamido]penicillanic acid in Examples 7 and 8, the corresponding mono- and di- sodium, potassium, ammonium, calcium and magnesium salts are prepared.

EXAMPLE 12

A tablet base is prepared by blending the following ingredients in the proportion by weight indicated.

| | |
|---|---|
| Sucrose, U.S.P. | 80.0 |
| Tapioca starch | 12.5 |
| Magnesium stearate | 7.5 |

Suffiicent 6-[2-carboxy-2-(2 - thienyl)acetamido]penicillanic acid, 3-pivaloyloxymethyl ester sodium salt is blended into the base to provide tablets containing 25, 100 and 250 mg. of active ingredient.

EXAMPLE 13

A suspension of 6-[2-carboxy-2-(2-thienyl)acetamido] penicillanic acid, 3-acetoxymethyl ester, sodium salt is prepared with the following compositions:

| | | |
|---|---|---|
| Penicillin compound | g | 31.42 |
| 70% aqueous sorbitol | g | 714.29 |
| Glycerine, U.S.P. | g | 185.35 |
| Gum acacia (10% solution) | ml | 100.00 |
| Polyvinyl pyrrolidone | g | 0.50 |
| Propyl parahydroxybenzoate | g | 0.072 |
| Distilled water to make one liter | g | 0.094 |

Various sweetening an flavoring agents may be added to this suspension, as well as acceptable coloring. The suspension contains approximately 25 mg. of penicillin compound per milliliter.

EXAMPLE 14

A parenteral form of 6-[2-carboxy - 2 - (2 - thienyl)-acetamido]penicillanic acid, sodium salt is prepared by dissolving an intimate mixture of the penicillin compound and sodium citrate (4% by weight) in sufficient polyethylene glycol 200 such that the final concentration of the penicillin compound is 25 mg. of active ingredient per milliliter. The resulting solution is sterilized by filtration and sterilely stoppered in vials.

Similarly, 7-[2-carboxy - 2 - (2 - thienyl)acetamido] cephalosporanic acid sodium salt is formulated to provide solutions for parenteral administration.

What is claimed is:

1. A compound selected from those of the formula:

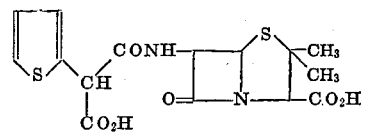

and the pharmaceutically acceptable base salts thereof.

2. A compound selected from those of the formula

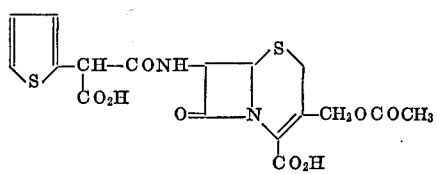

and the pharmaceutically acceptable base salts thereof.

References Cited

UNITED STATES PATENTS

| | | | |
|---|---|---|---|
| 3,502,656 | 3/1970 | Neal et al. | 260—239.1 |
| 3,697,507 | 10/1972 | Frederikson et al. | 260—239.1 |

FOREIGN PATENTS

| | | | |
|---|---|---|---|
| 1,208 | 7/1968 | Republic of South Africa | 260—243 C |

NICHOLAS S. RIZZO, Primary Examiner

U.S. Cl. X.R.

424—271, 246